(12) United States Patent
Sebille et al.

(10) Patent No.: US 7,102,304 B2
(45) Date of Patent: Sep. 5, 2006

(54) CONTROL DEVICE FOR A REVERSIBLE ROTATING ELECTRICAL MACHINE

(75) Inventors: Dominique Sebille, Arcueil (FR); Eckart Westerholt, München (DE)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 10/526,005

(22) PCT Filed: Aug. 26, 2003

(86) PCT No.: PCT/FR03/02572

§ 371 (c)(1),
(2), (4) Date: Sep. 14, 2005

(87) PCT Pub. No.: WO2004/018868

PCT Pub. Date: Mar. 4, 2004

(65) Prior Publication Data

US 2006/0108954 A1    May 25, 2006

(30) Foreign Application Priority Data

Aug. 26, 2002 (FR) ................. 02 10584
Mar. 10, 2003 (FR) ................. 03 03039

(51) Int. Cl.
 H02P 1/00  (2006.01)
 H02P 1/18  (2006.01)

(52) U.S. Cl. ............ 318/108; 318/107; 318/442; 363/145; 322/16; 322/28; 180/65.1; 180/65.3

(58) Field of Classification Search ........... 318/108, 318/107, 442; 363/145; 180/65.1, 65.3; 322/16, 28

See application file for complete search history.

(56) References Cited

U.S. PATENT DOCUMENTS 4,803,376 A * 2/1989 N'Guyen ............... 290/22
5,518,116 A * 5/1996 Morita ................. 206/387.1
6,209,517 B1 * 4/2001 Yasui ................. 123/339.11

(Continued)

FOREIGN PATENT DOCUMENTS

EP    0 406 182 A1    1/1991

(Continued)

OTHER PUBLICATIONS

Patent Abstracts of Japan, publication number 2000-316299, filed on Nov. 14, 2000 (2 pages).

Primary Examiner—Rita Leykin
(74) Attorney, Agent, or Firm—Osha Liang LLP (57) ABSTRACT

The invention relates to a control device for a reversible, multi-phased rotating electrical machine which can operate in alternator or motor mode. The inventive device comprises a main battery (4), an electric network (5) and a unit (3) for controlling and commanding an inverter and a rectifier bridge (P) for selection in alternator mode or starter mode. According to the invention, the machine is powered by the inverter which is connected to a start-up control unit which can provide a voltage greater than that provided by the main battery (4) over the network (5). The inverter is connected to the positive terminal of the secondary voltage source via a first switch (K1) in motor mode, while the rectifier bridge (P) is connected to the positive terminal of the main battery via a second switch (K2) in alternator mode.

20 Claims, 5 Drawing Sheets

U.S. PATENT DOCUMENTS

| | | | |
|---|---|---|---|
| 6,242,881 B1 * | 6/2001 | Giordano | 318/700 |
| 6,252,381 B1 * | 6/2001 | Schenk | 322/28 |
| 6,420,793 B1 | 7/2002 | Gale et al. | 290/34 |
| 6,504,259 B1 * | 1/2003 | Kuroda et al. | 290/40 C |
| 6,522,024 B1 * | 2/2003 | Takaoka et al. | 290/40 C |
| 6,894,402 B1 * | 5/2005 | Dubus et al. | 290/40 C |

FOREIGN PATENT DOCUMENTS

| | | |
|---|---|---|
| EP | 1 138 539 A2 | 10/2001 |
| JP | 2000-316299 A | 11/2000 |

* cited by examiner

CONTROL DEVICE FOR A REVERSIBLE ROTATING ELECTRICAL MACHINE

FIELD OF THE INVENTION

The invention relates to a control device for a reversible, multi-phased rotating electrical machine, particularly an automobile alternator-starter, which has a command and control unit to control the rotating electrical machine in alternator or motor mode, notably to start a thermal motor; the device includes:

a rotor surrounded by a stator equipped with phase windings for the electrical machine;

an inverter that powers the windings of the stator phase for operation in motor mode;

a rectifier bridge for the current generated by the windings of the stator phases for operation in alternator mode;

and a main battery connected to an electric power network, such as the onboard network of an automobile and to the ground of the rotating electrical machine.

STATE OF THE TECHNOLOGY

Figure 1:
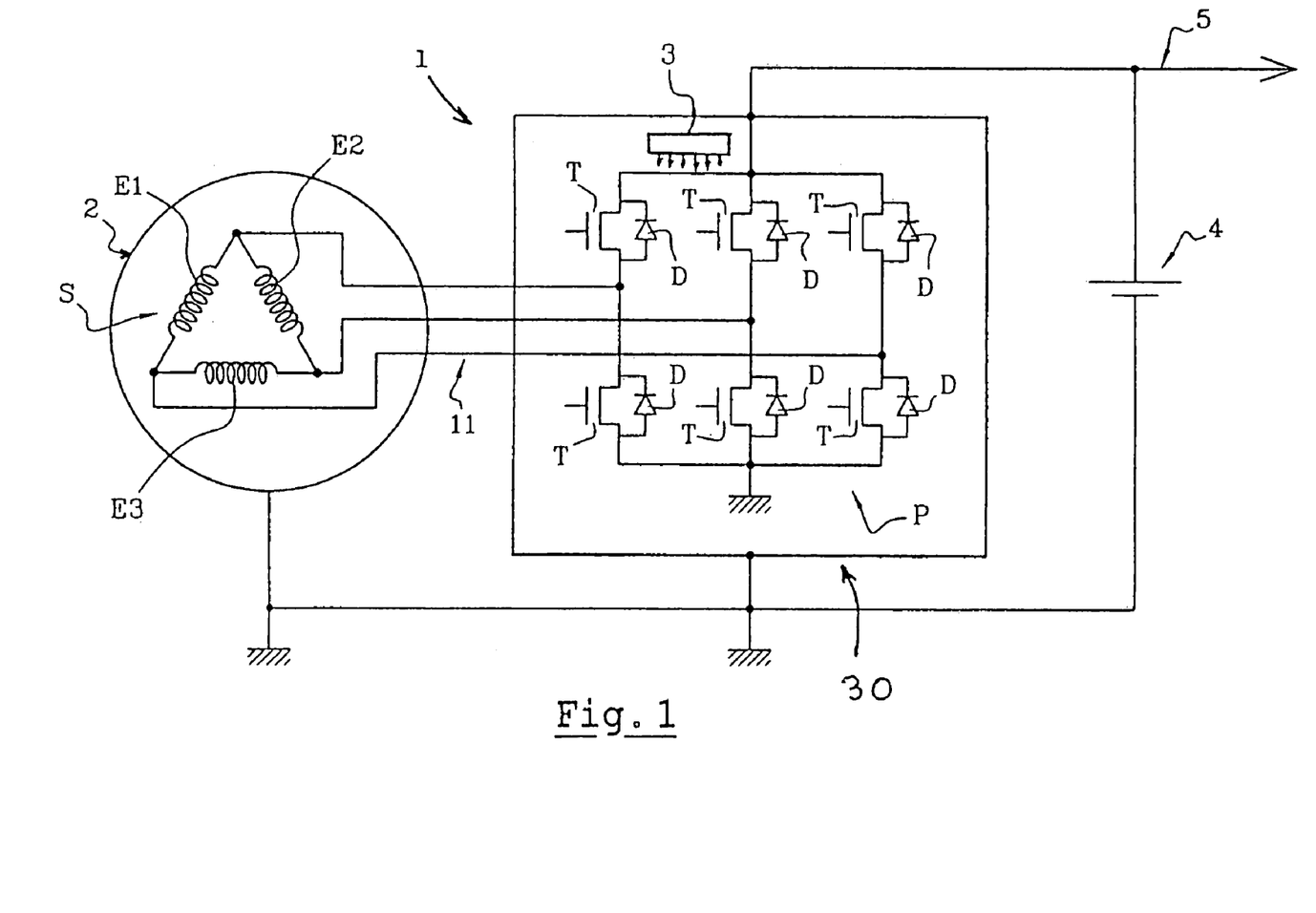
FIG. 1 shows a diagram of a start-up device for an alternator-starter according to prior art.

As shown in FIG. 1, a control device 1 of an automobile alternator-starter in accordance with prior technology, according to document FR A 2 745 444 or FR 2 745 444 (U.S. Pat. No. 6,002,219) for example, has an alternator-starter 2 driven by a control and command unit 3. A battery 4 supplies energy to the electric energy power network, in this case, the onboard electrical network 5 of the automobile. The battery 4 is also connected to the control and command unit 3.

This type of alternator is an multi-phased, reversible rotating electrical machine that can also operate as an electric motor, thus forming an alternator-starter 2 that can transform mechanical energy into electrical energy and vice-versa. Thus, an alternator-starter can be used, first, as an electric generator when it is driven by the thermal motor of the automobile vehicle and, second, as an electric motor, notably for start-up of the thermal motor with which it is associated. When it is used as an electric generator, it is said (by convention) that the alternator-starter is operating in alternator or generator mode, while when it is used as an electric motor, it is said by convention that the alternator-starter is operating in motor mode, i.e. at least in starter mode.

Everything depends on the power of the machine.

The machine may be used only to start the thermal motor. In a variant, it may have other functions.

In effect, as described in document WO 02/060711, to which we will refer for more details, when the machine is used as an electric motor, it can operate in two modes: i.e. a first mode, called the starter mode, that drives the thermal motor of the vehicle to start the vehicles with high torques for low rotation speeds, and a second mode, called auxiliary motor mode, which drives the machine alone or at least one power consumer and/or the thermal motor with higher rotation speeds than those in the first mode. In this document WO 02/060711, the torques in the second mode are lower than in the first mode.

Thus, an alternator-starter in starter mode can start the thermal motor of an automobile and, in auxiliary motor mode, can form an auxiliary electric motor to drive, for example, an air conditioner compressor or operate as an electric motor to prevent the thermal motor from stalling and/or drive the automobile at least over a short distance.

In all cases, we are looking for start-up of the thermal motor.

In a known manner, an alternator-starter includes:

a rotor that forms an inductor in alternator mode, and is equipped with at least one excitation winding traditionally associated with two slip rings and with two brushes, connected to a voltage regulator, through which the excitation current is transmitted to the excitation winding;

a multi-phased stator forming an armature in alternator mode and, to do this, it has several phases which include at least one phase winding, and which are connected in a star or a triangle and which deliver to an alternating current-direct current rectifier bridge, during alternator operation, the converted electric power;

means to monitor the angular position or the rotation of the rotor in motor mode in order to inject electric current at the right moment into the relevant winding of the stator. These means are advantageously the magnetic type and send data to the command and control unit and are described, for example, in documents FR-2807231 and FR 2806223. These means include a rotating calibrated target on the rotor or the pulley of the machine and at least one Hall-effect type sensor or magneto-resistive that detects the target which is advantageously the magnetic type. Preferably, at least three sensors are provided; they are mounted on a sensor holder carried by the front or back bearing which the rotating electrical machine contains to support the fixed stator and the rotating rotor.

In some cases, the means to monitor the angular position or rotation of the rotor consists of a resolver.

In general, the stator has three phases and three windings so that the alternator is the triphased type.

In some cases, the alternator has more than three phases, for example five or six phases.

The stator conventionally has a body, for example in the form of a packet of plates, equipped with notches, which are advantageously semi-closed, for mounting the phase windings.

The windings or coils can be made with coiled wire in the notches of the stator body or with conductor bars mounted in said notches to form pin networks, as described in document WO92/06527 for example. These bars may be rectangular or circular or hexagonal or other.

In some cases, each phase has at least two windings mounted in series, as described in the aforementioned WO92/06527, or in parallel as described in document DE A 1563 361 or EP A 0 454 039 or FR A 2 739 063.

In all cases, each phase has at least one winding carried by the stator.

Referring to these documents DE A 1563 361, EP 0 454 039 and FR A 2 737 063, we see that, in this case, there are two rectifier bridges mounted in parallel and star—star or star-triangle connections for the tri-phase windings of the phases. One or more windings are, therefore, mounted in each notch of the stator body.

The stator surrounds the rotor and the brushes are connected as described above to a voltage regulator of the alternator in order to maintain the alternator voltage at a desired voltage, 14V in this case, for a 12V battery.

In particular, this machine has the structure of a traditional alternator (standard), of the type described, for example, in document EP-A-05 15259 to which one may refer for more details.

This machine has internal ventilation (air cooling); its rotor has an internal ventilator at least at one of the axial ends. In a variant, the machine is cooled by water.

More specifically, the stator is carried by a fixed case that has one front bearing and one rear bearing, while the rotor is a clamp rotor with field poles, each of which is equipped with a flange that has, on the external periphery, teeth with an axial orientation and a trapezoid shape. The teeth of one field pole are directed toward the teeth of the other field pole, and said teeth are distributed so that they are imbedded in each other from one pole to the other.

Of course, as described in document FR-A-2793085 for example, permanent magnets can be inserted between the teeth of the field poles to increase the magnetic field and the power of the machine.

The rotor carries the aforementioned excitation winding between the flanges of its field poles. This winding has an electrically conducting element that is wound with the formation of turns. This winding is an excitation winding which, when it is activated by passage of an electric current, magnetizes the rotor to create magnetic poles with the teeth. The ends of the winding of the rotor are each connected to a slip ring and a brush rubs on each slip ring. The brushes are supported by a brush support integrated with the rear bearing of the machine, which has in the center a ball bearing that supports in rotation the rear end of the shaft carrying the rotor.

The front end of the rotor shaft is supported in rotation by a ball bearing carried by the front bearing of the machine. The front end of the shaft holds on the outside of the machine a pulley that is part of a movement transmission device that has at least one belt engaged with the pulley. The movement transmission device establishes a link between the pulley and an element, such as another pulley, driven in rotation by the thermal motor of the automobile.

When the machine (in this case an alternator-starter) operates in alternator mode, i.e. like an electric generator, the pulley is rotated by the thermal motor of the vehicle, also called an internal combustion engine, via at least the aforementioned belt. When the machine operates in motor mode, for example in starter mode, i.e. as an electric motor, the pulley drives the vehicle motor in rotation via the belt.

The front and rear bearings are perforated for the internal ventilation of the machine and are connected to each other, using tie rods for example. These bearings belong to the crankcase of the machine that is mounted on a fixed part of the vehicle. This crankcase or support has the stator mounted on the external periphery and the body of the stator is formed as previously described, usually by a packet of plates equipped with notches for mounting windings or, more generally, windings of the stator, the outputs of which are connected to the rectifier and control bridge described above.

In some cases, the rotor has several excitation windings mounted around projecting poles.

In some cases, this rotor with projecting poles and several excitation windings also have permanent magnets alternating circumferentially with the projecting poles and excitation windings as described in document WO 02/054566 to which one may refer for more details. In this case, the rotor has a body that is advantageously in the form of a packet of plates mounted on the shaft of the rotor and cut to form projecting poles and housings for the permanent magnets.

When it operates in alternator mode, the alternator-starter 2 transforms a rotation movement of the armature rotor, driven by the thermal motor of the vehicle, into an induced electric current in the windings of the stator, particularly to charge the battery of the vehicle and electrically power the equipment and, generally, the consumer devices of the automobile vehicle network.

When the alternator-starter operates in motor mode, with the stator then forming an inductor winding and the rotor forming an armature, it drives the rotation of the thermal motor of the vehicle, via the rotor shaft, particularly for start-up.

The device that powers the windings of the stator phases synchronously for its operation in electric motor mode is an inverter. Such an inverter can be electronic and fabricated from the rectifier bridge that is equipped with switching devices (such as, for example, MOSFET type transistors), which are driven sequentially, via drivers for example, from a command unit to power the stator phases synchronously.

In the preceding section, the inverter powers the windings of the stator phases for its operation in motor mode and forms a rectifier bridge for the current generated by the windings of the stator phase for operation of the stator in alternator mode.

In one fabrication method, the inverter may be completely mechanical as described in patent request FR 01-09296 filed on Jul. 12, 2001 and published under number FR A 2 827 7438. In this case, the rectifier bridge is distinct from the inverter and is carried, for example, by the rear bearing of the machine.

The alternator-starter 2 is driven by the command and control unit 3, which controls or drives:

an alternating current-direct current rectifier bridge P connected through electric link devices 11 to the different phases of the armature formed by the windings E1, E2, E3 of stator S, connected in this case in a triangle. This bridge is mounted between the ground and a power terminal of the vehicle battery 4 connected to the onboard network 5.

This bridge P is formed by multiple diodes D forming the rectifier bridge P and by multiple switches, such as transistors T, which are mounted in parallel on the diodes D and control the various phases of the armature. In motor mode, the diodes function as one-way clutch diodes and, in generator or alternator mode, they operate as a rectifier bridge. The transistors T are advantageously MOSFET type transistors. Note that such power transistors integrate by construction a diode between their drain and their source. They also allow forming the rectifier bridge P and phase control with only transistor components which act both as switches and one-way clutch diodes.

Thus, in an alternator-starter, the rectifier bridge has two operating modes:

rectifier mode in which it rectifies the alternating current generated by the windings of the stator when the machine operates in generator or alternator mode;

command mode for the windings of the stator phases forming the armature of the electric motor. In this case, the rectifier bridge operates like an inverter which imposes a direct current in the inductor winding (the stator) by delivering synchronously to the phases of the stator signals dephased by 120°, which are ideally sinusoidal waves, but may be trapezoidal or square. The signals that controls the transistors connected to the battery are controlled in an opposing phase with the signals that control the transistors connected to the ground. These signals delivered by unit 3 here control the grids of the transistors and have not been shown for reasons of simplification.

For more details, refer to document FR-A-2745445 cited above.

The control and command unit 3 is mounted (FIG. 1) in an electronic box 30 that contains the rectifier bridge P. The unit 3 has, for example, drivers that belong to an electronic power and command module for the rectifier bridge, which drive the rectifier bridge for its operation in inverter mode by generating the signals controlling the grids of the transistors T.

The unit 3 also has a driver management unit. This management unit receives the signals from the sensors that are part of the devices monitoring the angular position of the rotor and transmits these signals to the drivers which drive the transistors. The drivers have logic inputs to select the alternator or motor mode.

There is also:

a voltage regulator to maintain the voltage of the alternator at a desired voltage, 14 V in this case for a 12V battery;

and advantageously, an overexcitation circuit of the rotor may advantageously be used to obtain more torque at the start-up of the thermal motor of the vehicle. This overexcitation may be achieved by an overvoltage at the terminals of the excitation winding and/or an overamperage in the excitation winding of the rotor in comparison with a conventional alternator. This may be achieved using an electronic booster that overexcites the winding of the rotor only in start-up mode. The overexcitation circuit is active primarily in starter mode to make the start-up torque of the alternator-starter maximum and start more easily the thermal motor, also called an internal combustion motor, of an automobile, either during a cold start-up, or during a re-start-up after a shutdown at a red light, when the motor has been cut to reduce the consumption of fuel and thus perform a function known as a Stop-GO function. This overexcitation circuit receives as input the onboard network voltage delivered by the battery and/or the alternator, and delivers to the terminals of the excitation winding a voltage greater than this onboard voltage. For more information, refer to patent application WO 01/45250 or WO 02/060711 cited above.

This control and command unit 3 and the rectifier bridge and the voltage regulator are, for example, placed in the electronic box 30 placed on the outside of the machine.

When the alternator-starter operates in starter mode or in auxiliary motor mode, it must transmit to the thermal motor a very high torque to guarantee good cold starts. A high torque at start-up can also offer the advantage of being able to use a low-power alternator-starter for starting a vehicle with larger displacements. Although it is possible to increase the torque at start-up by overexciting the rotor; the maximum torque that can be supplied by an alternator-starter in which the armature phases are controlled by peaks with a voltage close to the voltage of the onboard network is limited by the value of the onboard voltage.

Thus, for an alternator-starter sized for a thermal motor, it is not possible, under the same onboard network voltage, to use it for example for a more powerful thermal motor that requires a higher start-up torque.

Another problem of current vehicles is the problem of the electric power of the equipment and consumer devices installed in the vehicle which continues to increase. The current power of 2 kW is no longer sufficient for some vehicles, and we will rapidly need power of 3 kW. The other characteristics of the electric power are that it must be generated with a high yield and with a high level of operating safety, in order to be able to power certain safety features that will become electric.

If the demand for peak power is for a short time, it can be provided by the battery, but this is not always possible. This disturbs the stability of the onboard network and causes sequences that are harmful to the life of the battery.

Document WO 02/080334 described a drive system for an automobile, which includes an alternator-starter to power a high voltage onboard network (48V), an energy accumulator, a main battery, and control command devices that provide various functions based on various parameters corresponding to the generator mode or the motor mode. A voltage of 48V is a solution to this problem of an increase in installed power, but the alternator-starter must be designed for a voltage of 48V, which generates a high cost compared with traditional 12 V or 14V machines.

OBJECT OF THE INVENTION

The purpose of the invention is a control device for a reversible rotating electric machine, notably an automobile alternator-starter, that does not present these disadvantages and which allows using this machine for automobiles which require an increase in the installed electric power and a start-up torque higher than the torque for which the machine was initially designed.

For this purpose, the invention proposes a control device for a rotating electrical machine of the type described above, which includes a main battery connected to an electric energy power network (such as the onboard network of an automobile) and to the ground of the rotating electrical machine, a rectifier bridge and an inverter powered in motor mode by a start-up control unit that has a secondary voltage source, and can provide voltage higher than the voltage present in the electric energy power network, to increase the torque of the machine at the start-up of the thermal motor; the inverter is connected to the positive terminal of the secondary voltage source via a first switch in motor mode, while the rectifier bridge is connected to the positive terminal of the main battery via a second switch in alternator mode.

Thus, the electrical machine, such as an alternator-starter for an automobile, can be used for different thermal motors that require a different start-up torque, without modifying the general electrical-technical design of the machine. This solution is, therefore, simple and economical.

The second switch is crossed by the permanent maximum current of the electrical machine in generator or alternator mode, while the first switch is used for the transient phase in motor mode and must temporarily support a stronger passage current.

The invention is advantageously completed by the following different characteristics, taken alone or in all possible combinations:

the secondary voltage source is connected in series to the main battery;

the secondary voltage source is connected in parallel with the main battery;

the secondary voltage source is a battery;

the secondary voltage source is, for example, a very high-capacity double-layer condenser;

the switches are MOSFET transistors;

the MOSFET switches are each composed of two MOSFET transistors mounted head to foot in series;

the switches are electromechanical switches;

the two switches are activated in phase opposition;

the two switches are driven by a switching and control unit that is slaved to the control and command unit of the alternator-starter;

the switching and control unit is integrated in the start-up control unit;

the charge level of the secondary voltage source is controlled and managed by a management unit;

the management unit consist of a battery charger;

the management unit consists of a voltage-controlled current source;

the voltage of the secondary voltage source may vary between 3 Volts and 28 Volts;

the inverter is mechanical;

the inverter is a rectifier bridge that has controlled switches.

The start-up control unit contains:

a main circuit that includes the principal battery connected to the electrical power network, and a second switch connecting the main battery to the rectifier bridge;

a bypass circuit branched in parallel to the terminals of the main circuit, including the secondary voltage source in series with a first switch;

and a reversible DC/DC converter connected electrically between the main circuit and the bypass circuit between the positive pole of the main battery and a middle point on the first switch and on the secondary voltage source.

In the two cases of series or parallel coupling, the general electric-technical design of the electrical machine, such as an automobile alternator-starter, is not modified as a result of the conservation of the conventional voltage at 14V.

The insertion of the secondary voltage source, combined with the use of the DC/DC converter managed by a supervisor circuit increases the start-up torque, and allows working temporarily under a higher voltage to receive more energy on the electrical power network.

The following characteristics, taken alone or in combination, may be used for a parallel coupling:

a supervisor circuit controls and commands the switching status of the power switches, the load status of the main battery and the secondary voltage source, the direction of conversion of the DC/DC converter, and the operating mode of the rectifier bridge as a generator or a motor;

the second switch is crossed by the permanent maximum current of the electrical machine in generator or alternator mode, while the first switch is used for the transient phases when the output voltage of the electrical machine is greater than a pre-defined voltage threshold, notably 14V;

the supervisor circuit reverses the switching status of the switches when the output voltage of the alternator is regulated above the voltage threshold, with the second switch open and the first switch closed, to provide current to the onboard network through the DC/DC converter;

the energy of the electrical machine operating in generator mode allows, when the first switch is in closed position, to self-power the DC/DC converter and to charge the secondary voltage source by storing energy;

high-power receivers can be connected electrically in parallel from the bypass circuit and the electrical machine.

BRIEF DESCRIPTION OF THE DRAWINGS

Other advantages and characteristics will appear more clearly from the following description of specific methods for fabricating the invention given as non-limiting examples, and shown on the attached drawings in which.

DESCRIPTION OF SPECIFIC MODES OF FABRICATION

For purpose of clarification, the elements common to the different figures will be assigned the same reference numbers.

In FIGS. 2 to 5, the multi-phase rotating electrical machine is an alternator-starter for an automobile. This machine is configured to be reversible, as described above, so that it operates, first, as an electric generator in alternator mode and, second, as an electric motor in starter mode to start a thermal motor, an automobile engine in this case.

The electric power network is then formed by the onboard network 5 of the vehicle to which the equipment and consumer devices installed on the vehicle are connected.

Figure 2:
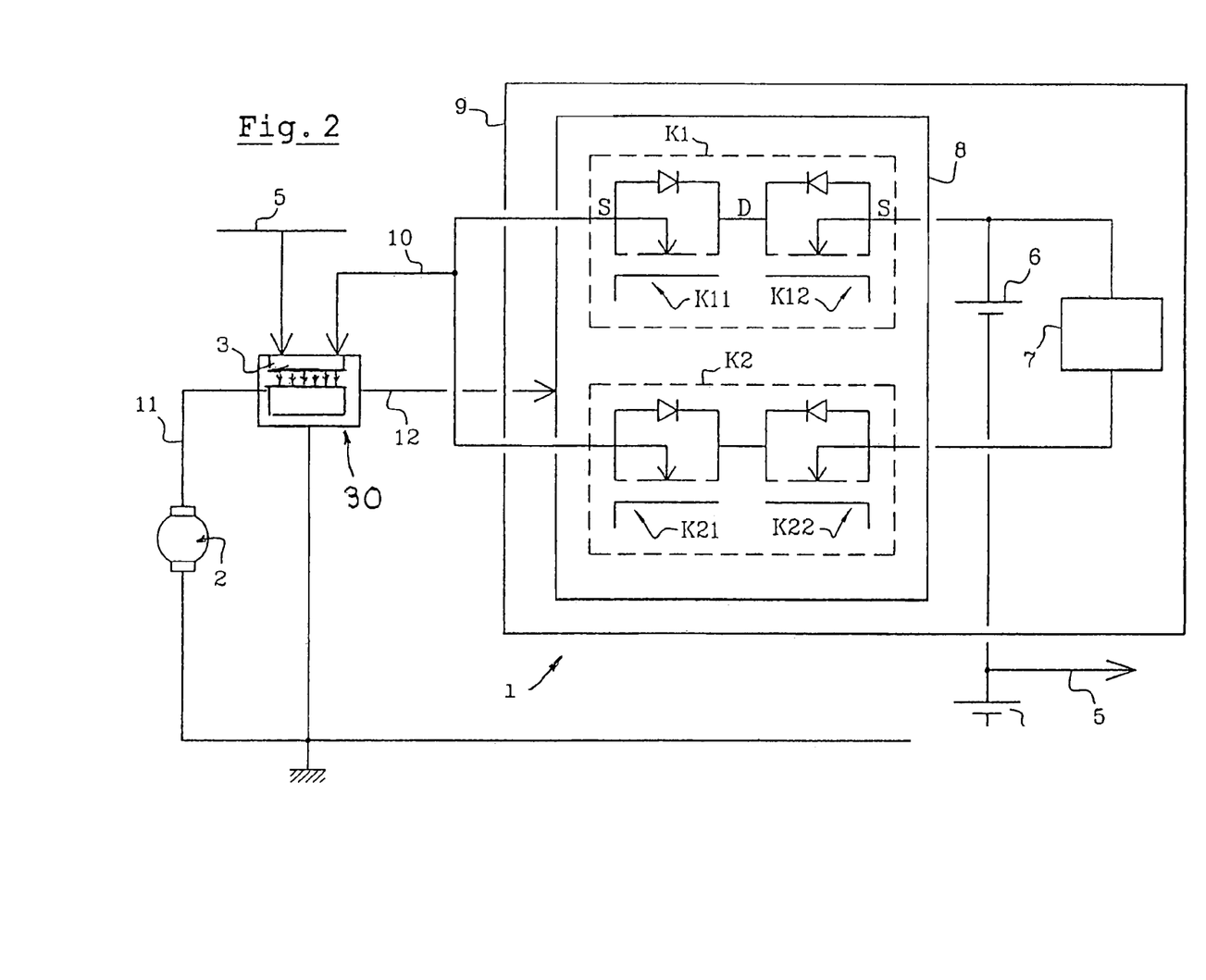
FIG. 2 shows a diagram of a start-up device according to a first mode of fabricating an alternator-starter according to the invention.

According to a first method of fabricating the invention, as shown on FIG. 2, the control device of an automobile alternator-starter 2 has, as in FIG. 1, a control and command unit 3 for the alternator-starter which is placed in an electronic box 30, and is connected to the alternator-starter through electric link devices 11, for example a link with connectors and cables described in document WO 02/060038. The electronic box 30 contains the inverter and the rectifier bridge P with controlled switches, shown in FIG. 1, driven by unit 3. A battery 4 is connected between the onboard network 5 of the automobile and the machine ground.

According to one characteristic of the invention, a start-up control unit 9 is inserted between the vehicle onboard network 5 (or the positive terminal of the main battery 4) and the command and control unit 3 of the alternator-starter.

This start-up control unit 9 has a secondary voltage source 6 that is mounted in series with the main battery 4. Thus, the positive terminal of the main battery 4 is electrically connected to the negative terminal of the secondary voltage source 6. The command and control unit 3, which drives the inverter and the rectifier bridge, is connected, through an electric link device 10, first to the positive terminal of the secondary voltage source 6 via a first switch K1 and, second, to the positive terminal of the main battery 4 via a second switch K2.

This secondary voltage source 6 thus powers the windings of the stator phases of the stator of the alternator-starter 2, via the inverter mounted in the electronic box 30 that contains the command and control unit 3, under a voltage greater than the voltage available on the onboard network 5.

According to current practice, the value of the secondary voltage source may vary between 3V and 12V. Thus, if the onboard network 5 has a voltage of about 14V, the phases of the inductor winding of the alternator-starter 2 (operating in starter mode, i.e. as an electric motor) can be powered via the inverter under a voltage that can vary between 15 and 24 Volts.

A switching and control unit 8 manages the switches K1 and K2. Thus, according to the invention, the switching and control unit 8 controls the switches K1 and K2 so that they are neither open or closed at the same time. Therefore, the switches K1 and K2 are controlled in phase opposition.

This switching and control unit 8 is here integrated in the start-up control unit 9 and is slaved to the command and control unit 3 of the alternator-starter. Thus, when the alternator-starter is in starter mode, the command and control unit 3 sends an order, through a wire electric link 12 for example, to the switching and control unit 8 to simultaneously open switch K2 and close switch K1. Thus, the phases of the alternator-starter stator are powered, at least during the start-up phase of the automobile thermal motor, under voltage greater than the voltage on the onboard network 5.

When the alternator-starter has completed its start-up sequence, it switches to alternator mode. The command and control unit 3 then sends, through the wire link 12 for example, an order to the switching and control unit 8 to simultaneously open switch K1 and close switch K2. Thus, the alternator-starter can transmit current on the onboard network 5 through the rectifier bridge contained in the box 30 containing the command and control unit 3 of the alternator-starter.

According to one characteristic of the invention, the switches have different characteristics. The switch K1, dedicated only to the start-up phase of the alternator-starter must, for example, be able to support the passage of a start-up current of 600 A, while the switch K2 must be able to support an alternator charge current of about 150 A.

These two switches K1 and K2 may be the electromechanical type (relay or contact) or electronic, for example MOSFET type transistors. The choice is made on the basis of the conditions of use and the constraints related for example to noise and frequency of use. Note that the electronic switches are the static type. These electronic switches are advantageous because they are more economical, less noisy, more reliable and have a long life.

Advantageously, according to one characteristic of the invention, the switches K1 and K2 are respectively each composed of two MOSFET type N power electronic switches K11, K12 and K21, K22, mounted top to bottom and in series, in order to ensure the voltage reversibility of the system and protect the mounting against the inversion of polarity when one or the other voltage source is connected.

In the case where the protection against the polarity inversion is assured in a different manner, K12 and K22 are no longer necessary, and only switches K11 and K21, which have their drains connected to a battery, are maintained.

The secondary voltage source 6, according to the application, may be an ultracapacity also called a supercondenser or double-layer condenser, or even a low-capacity battery with high power, in order to be able to deliver a strong current in a small volume only during the start-up phase of the thermal motor.

The charge of this voltage source is provided by a charge device 7, which may be a charger or a voltage-controlled current source.

The terminals of this charge device are electrically connected to the transistors K12 and K22.

Figure 3:
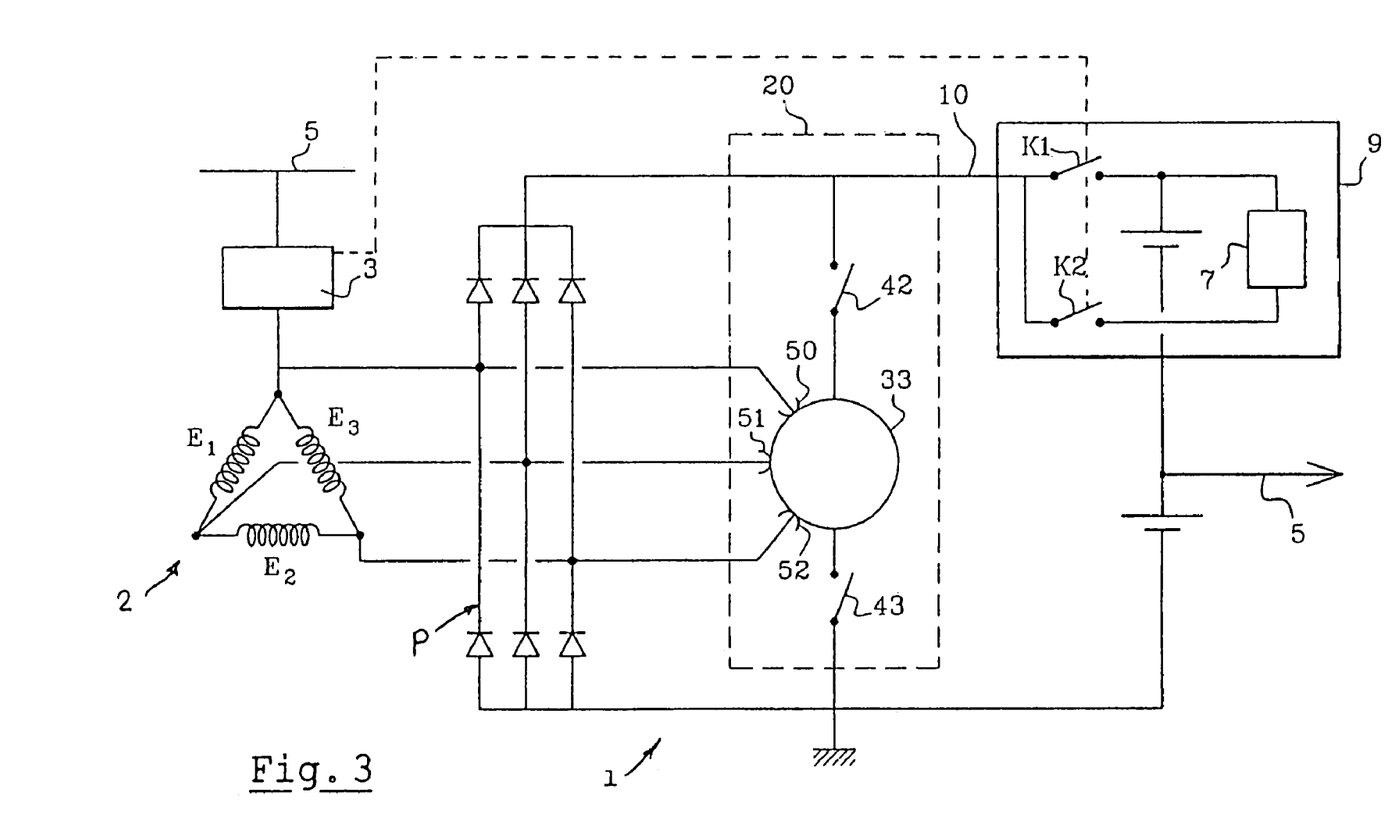
FIG. 3 shows a diagram of a start-up device according to a second mode of fabrication of an alternator-starter with a mechanical inverter according to the invention.

According to a second fabrication method, as shown in FIG. 3, the windings of the phases of the alternator-starter stator may be power synchronous, in the start-up phase, by a mechanical inverter as described previously.

The windings E1, E2, E3 of the stator phases have outputs which are, for example, connected in a triangle and are connected to the rectifier bridge P with diodes, carried for example by the rear bearing of the alternator-starter.

This mechanical inverter 20 has three parts, i.e. two smooth rings (not shown) and a blade slip ring 33. The rings and the slip rings are placed on a rotating body (not shown).

According to the invention, the rings are each connected, via a brush and a mechanical contact 42, 43 of a power contact, first to the output 10 of the start-up control unit 9 previously described (which contains the secondary voltage source 6) and, second, to the ground.

Thus, in starter mode, the control and command unit 3 gives the order to the start-up switching and control unit 9 to close K1 and open K2, powering the mechanical inverter 20 and, as a result, the stator windings E1, E2, E3 under voltage greater than the voltage on the onboard network; said voltage corresponds to the serial connection of the two batteries 4 and 6.

Associated with the mechanical inverter 20 are three brushes 50, 51, 52 which are arranged around a slip ring that rubs the blades. The brushes are separated from each other by an electric angle of 120°. The brushes 50, 51, 52 are connected respectively to the stator windings 12, 13 and 14 of the alternator 2. Thus, each winding terminal successively receives the positive potential, neutral potential, negative potential, neutral, potential, positive potential and so on.

Therefore, the assembly that just been described operates as a mechanical inverter. For more details, refer to patent request FR 01-09296 filed on Jul. 12, 2001 and published under number FR A 2 827 438.

In this case, the unit 3 controls the electric power of the coil of the coupling device, acting on a grooved sleeve that is simultaneously engaged inside on a grooved section of the back end of the rotor shaft and on a grooved section of a shaft of the inverter in motor mode.

Clearly, the invention may also be applied to conventional starters, where one wants to reduce the start-up time of the automobile thermal motor for the driver's comfort, for example in starter cut-off and start applications with an automatic "stop and go" command, the English term used by people in the industry. In this type of starter, it is also possible, according to the invention, to power the rotor windings of the electric starter, which are controlled by a mechanical inverter, under voltage higher than the voltage on the onboard network, using a secondary voltage source 6 mounted in series with the main 12 volt battery 4.

In some embodiments (FIG. 4), the secondary voltage source 6 can also act on a DC/DC converter and thus have a dual function and is connected in parallel with the main battery 4.

Figure 4:
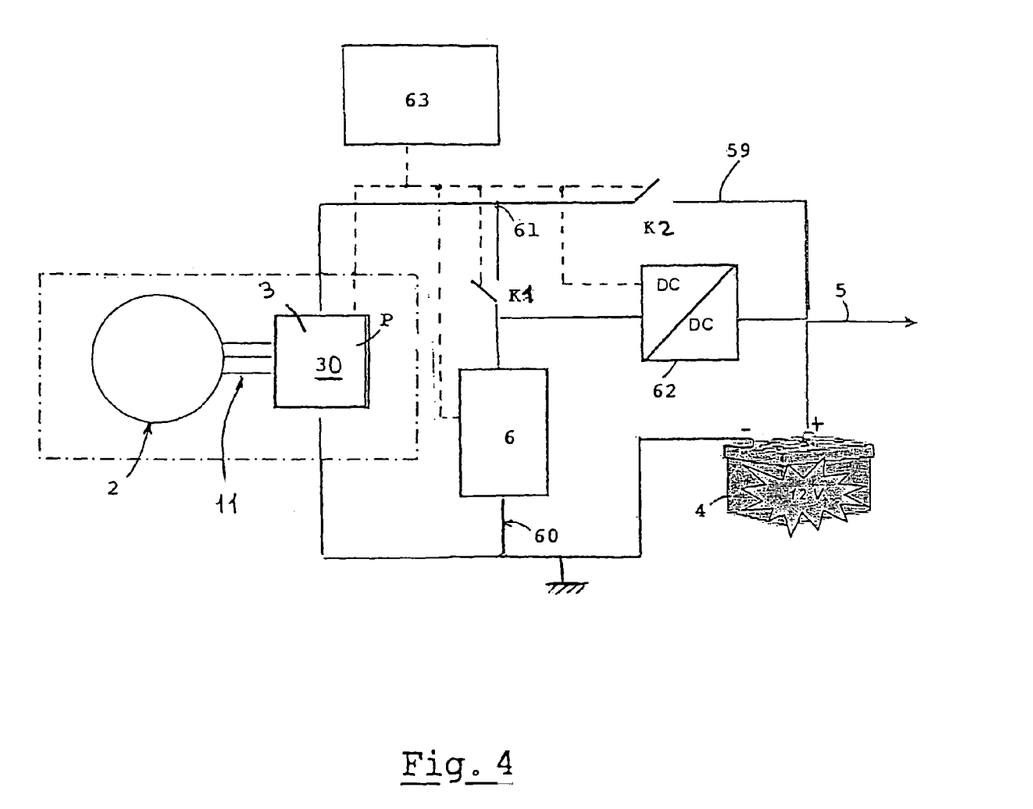
FIG. 4 shows an electrical diagram of a third mode of fabrication of an alternator-starter according to the invention.

In this third method of fabrication shown in FIG. 4, the same reference numbers will be used to designate parts that are identical or similar to those in FIGS. 1 to 3. The alternator-starter 2 is a standard machine with 14 Volts that has a rectifier bridge P that conforms with the bridge in FIG. 1. This bridge P is driven by the command and control unit 3. A main battery 4 powers the onboard 12V network 5, and is connected to a main circuit 59 between the ground and the rectifier bridge P through a second switch K2.

The rectifier bridge P, which forms an inverter in starter mode, as described above, is then connected to the positive terminal of the main battery 4 via the switch K2.

A bypass circuit 60 connected in parallel to the terminals of the rectifier bridge P, includes a secondary voltage source 6 in series with the first switch K1. The two circuits 59, 60 are connected in parallel between the ground and a point 61 common to the two switches K1 and K2. The secondary voltage source 6 can be an 18V or 24V battery, or an assembly of SCAP-type double-layer condensers, the maximum voltage of which is between 20V and 28V.

The first switch K1 is connected electrically to an input terminal of a DC/DC converter 62 connected through its output terminal to the positive pole of the main battery 4. The DC/DC 62 has an input voltage that can vary from 0 to 28V, to deliver an output voltage between 13V and 15V. The rated power of the DC/DC converter 62 is preferably between 400 W and 1000 W, while its transient power can be increased by 50% with a declassification that is a function of temperature. The direction of conversion of the DC/DC converter 62 may be modified as a function of the operational phases of the alternator-starter 2.

The second switch K2 may support the maximum current of the alternator-starter 2 between 100 A and 250 A direct current.

The first switch K1 is used for the transient phases and for the start-up phases when the output voltage of the alternator-starter 2 is greater than 14V. It can support a permanent current between 50 A and 150 A, and a transient current that may be as high as 600 A.

A supervising circuit 63 controls and drives the switching status of the switches K1, K2, the charge status of the main battery 4 and the secondary voltage source 6, the conversion direction of the DC/DC converter 62, and the operating mode of the rectifier bridge P, as an electric generator or an electric motor.

This supervising current 63 belongs partially to the command and control unit 3 because it acts, for example, on the drivers to make the bridge P work in rectifier mode or in command mode for the phase windings (operation as an inverter).

Of course, the supervising current can be mounted in the box 30 that contains the unit 3 or outside the box. This box may contain only the bridge P or possibly a part of the unit 3, for example the aforementioned drivers. All this depends on the application.

The operation of the interconnection circuit of the alternator-starter 2 in FIG. 4 is as follows:

Vehicle Thermal Motor Operating After Start-Up.

Phase A

After start-up, the vehicle thermal motor drives the rotation of the alternator-starter 2, which functions in generator mode or alternator mode. In the case where the output voltage of the alternator is regulated between 13V and 15V by the voltage regulator, the second switch K2 is closed, while the first switch K1 is open. The closing of the second switch K2 supplies the current to the onboard network 5 by the rotating machine, and the DC/DC converter 62 may be active or out of service. In the case where the DC/DC converter 61 is operating, it is powered by the secondary voltage source 6 as long as energy remains available. The current of the DC/DC converter 62 is then regulated by adapting the output voltage to that of the alternator. The current delivered by the DC/DC converter 62 is added to the current of the alternator in the onboard network 5.

Phase B

In the case where the output voltage of the alternator is regulated to a voltage greater than 15V, the supervising circuit 63 inverts the switching status of the switches K1, K2. The second switch K2 is open, and the first switch K1 is closed, so that the current is supplied to the onboard network 5 by the DC/DC converter 62, the voltage of which is regulated at its output. When the current consumed in the onboard network 5 is greater than the power of the DC/DC converter 62, this converter is regulated in current mode and maintains its maximum power. The additional power is then supplied by the main battery 4, which imposes its output voltage to the DC/DC converter 62 and to the onboard network 5. The DC/DC converter 62 is self-powered by the energy from the alternator, and the secondary voltage source 6 (battery or condensers) is charged by storing energy.

Vehicle Thermal Motor Off

Phase C

The alternator-starter 2 is driven by the supervising circuit 63 for operation as an electric motor adapted to the start-up of the thermal motor (starter mode).

If the charge status of the secondary voltage source 6 is between 12 V and 28V, the alternator-starter 2 is powered exclusively by the secondary voltage source 6, at a voltage greater than the rated voltage of 12V of the main battery 4. The first switch K1 is closed, and the second switch K2 is open during this process. The start-up torque of the starter is thus increased because of the overvoltage generated by the discharge of the secondary voltage source 6.

Phase D

If the charge status of the secondary voltage source 6 is less than 12V, i.e. less than the rated voltage of the main battery 4, the reversible DC/DC converter 62 is reversed by the supervising circuit 63 to recharge the secondary voltage source 6 to the voltage required to start the thermal motor. The first switch is open during the sequence to charge the secondary voltage source 6.

Phase E

During the rotation of the thermal motor, the supervising circuit 63 can send an open order to the two switches K1 and K2, in order to authorize joint power to the onboard network 5 by the main battery 4 and by the secondary voltage source 6 through the reversible DC/DC converter 62. The main battery 4 and the secondary voltage source are then connected in parallel.

The supervising circuit 63 may thus control the management of several operating phases of the vehicle in order to improve the performance of the alternator-starter:

| S1 - SITUATION | PHASE |
| --- | --- |
| Start-up after a short shutdown (<1 weeks) | C |
| Road travel (<100 km/hr) and constant speed | A |
| Freeway travel (<100 km/hr) and constant speed | A -switching to B and C possible |
| If braking | A –> B |
| New travel | B –> E |
| Travel at low speed with high absorbed current | B |
| Start-up after long shutdown (>1 week) | D |

During driving at constant speed on a freeway, the supervising circuit 63 detects that the energy consumption of the onboard network 5 is less than the power of the DC/DC converter 62. The alternator is then switched to phase B. Under these conditions, the yield may increase by 10%; even though the DC/DC converter 62 has a yield of 95%, the generation performance is generally improved by 5%, which is 50 W out of a consumption of 1000 W.

In the case of braking, the phases B and C are used successively. During the deceleration phase, the supervising circuit 63 decides first to function in phase B, with charging of the secondary voltage source 6. It then passes to phase C, followed by discharging of the secondary voltage source 6 through the DC/DC converter 62. However, the minimum voltage of the secondary voltage source 6 is maintained at an ideal given value to perform a restart.

Figure 5:
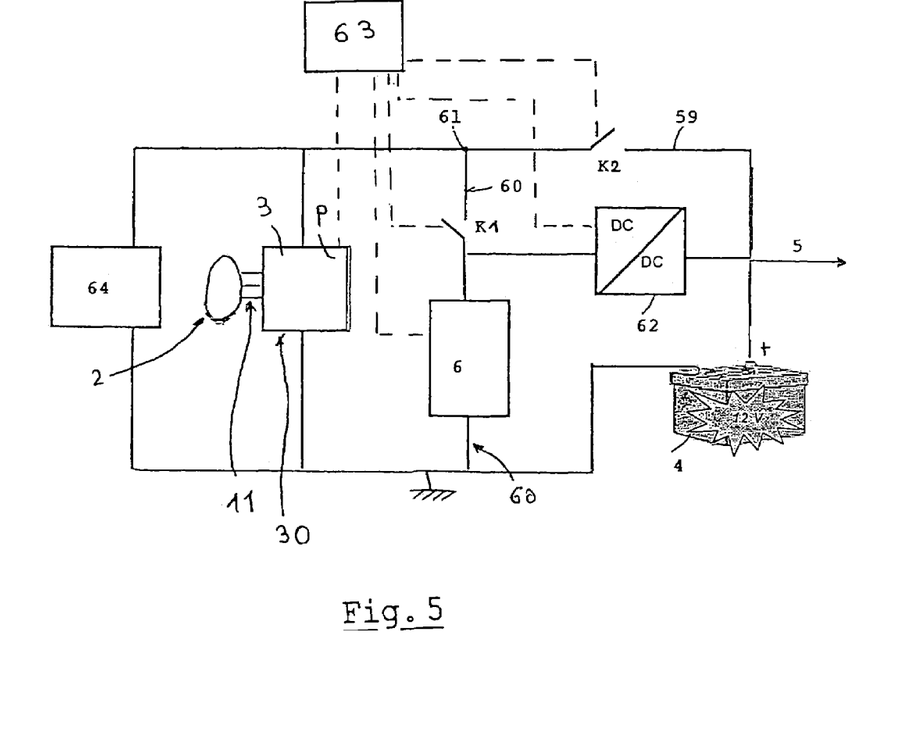
FIG. 5 shows a variant of FIG. 4.

In FIG. 5, high-power receptors 64 are connected to the terminals of the alternator-starter 2, particularly a heating windshield, the air conditioning system, and any other auxiliary electric circuit. These receptors 64 are connected in parallel to the terminals of the bypass circuit 60. To increase their power, it is sufficient to pass from phase A to phase B and to regulate the generation voltage to the desired value.

Of course, this invention is not limited to the fabrication examples described.

Thus, the electronic box 30 is, in some embodiments, supported by the machine; it is, for example supported by the outside periphery of the crankcase of the machine.

In some embodiments, the rectifier bridge and/or the voltage regulator are carried by the rear bearing of the machine, while the command and control unit 3 is located outside the machine. In one variant, the power stage of this unit 3, which contains the aforementioned drivers, is carried, along with the bridge, by the rear bearing of the machine, while the management unit of this command and control unit is placed outside the machine, as described for example in patent application FR 02 08420 filed on Jul. 4, 2002. In this case, each driver is connected near the transistors of one branch of the rectifier bridge.

Based on this document FR 02 08420, we see that the rectifier bridge may contain several modules in which each have power transistors, of the MOSFET type for example, and one driver.

Of course, each MOSFET type transistor is, in one fabrication method, formed by a set of transistors mounted in parallel to reduce heating. This is applicable particularly to the transistors of the rectifier bridge and/or the switches K1 and K2.

The description shows that the command device according to the invention can be used in starter mode to cold start the thermal motor and can also be used to restart the thermal motor, after a stop at a stop light for example, and to prevent the thermal motor from stalling, particularly during idling. In this last case, the unit 3 drives the machine to temporarily operate in motor mode. This function to assist the thermal motor is called the boost function. In addition, using the invention, we can move the vehicle temporarily using the machine, during a parking maneuver for example. One can also use the machine according to the invention to start a turbo-compressor.

Generally, the device according to the invention can also be used in auxiliary motor mode, notably when the vehicle is stopped at a red light, to temporarily power at least one accessory. We can use the device to drive the machine only before shifting to alternator mode, so that a declutching device, like an electromagnetic clutch or controlled one-way clutch, can intervene between the machine and the thermal motor. A declutching device can also act between the machine and the accessory or equipment to be assisted. For more details, refer for example to the document WO 02/060711 cited above; the electric machine can be disconnected from the thermal motor in auxiliary motor mode.

Of course, the machine according to the invention starts a thermal motor and can perform only some of the functions described above.

The automobile can be of the land type, such as a passenger car, truck, bus or other. As a variant, the invention is applicable to boats having a thermal motor.

The invention claimed is:

1. A control device (1) for a rotating electrical machine, configured to be connected to a ground and to be reversible to operate as an electric generator in an alternator mode and as an electric motor in motor mode in order to start a thermal motor, including a command and control unit (3) to control the rotating electrical machine in alternator mode or in motor mode, an electric power network (5), a main battery (4) connected to the electric power network (5) and to the ground of the rotating electrical machine (2), the rotating electrical machine comprising:
    a plurality of phases each having at least one winding (E1, E2, E3);
    a stator (S) equipped with phase windings;
    an inverter (P, 20) which powers the phase windings of the stator for operation in motor mode;
    a rectifier bridge for current generated by the phase windings of the stator for operation in alternator mode;
    characterized in that the inverter (p, 20) is powered in motor mode by a start-up control unit (9) which has a secondary voltage source (6) that can provide a voltage greater than the voltage present on the electric power network (5) to increase the machine torque at the start-up of the electric motor, in that the inverter is connected to the positive terminal of the secondary voltage source (6) via a first switch (K1) in motor mode, and in that the rectifier bridge (P) is connected to the positive terminal of the main battery (4) via a second switch (K2) in alternator mode.

2. The control device (1) according to claim 1, characterized in that the start-up control unit (9) has a secondary voltage source (6) connected in series with the main battery (4).

3. The control device (1) according to claim 1, characterized in that the start-up control unit (9) has a secondary voltage source (6) connected in parallel with the main battery (4).

4. The control device (1) according to claim 1, characterized in that the secondary voltage source (6) is a battery.

5. The control device (1) according to claim 1, characterized in that the secondary voltage source (6) is of ultra-capacity.

6. The control device (1) according to claim 1, characterized in that the first and second switches (K1, K2) are MOSFET type transistors.

7. The control device (1) according to claim 6, characterized in that the MOSFET switches (K1, K2) each comprise two MOSFET transistors mounted head to tail in series (K11, K12, K21, K22).

8. The control device (1) according to claim 6, characterized in that the two switches (K1, K2) are activated in opposing phases.

9. The control device (1) according to claim 2, characterized in that the two switches (K1, K2) are controlled by a switching and control unit (8), which is slaved to the command and control unit (3) of the rotating electrical machine.

10. The control device (1) according to claim 2, characterized in that the charge level of the secondary voltage source (6) is controlled and managed by a management unit (7).

11. The control device (1) according to claim 2, characterized in that the voltage of the secondary voltage source (6) can vary between 3 volts and 12 volts.

12. The control device (1) according to claim 1, characterized in that the inverter is mechanical.

13. The control device (1) according to claim 1, characterized in that the inverter is a rectifier bridge (P) that has controlled switches (T).

14. The control device (1) according to claim 3, characterized in that it comprises:

a main circuit (59) that includes the main battery (4) connected to the electric power network (5), and the second switch (K2) connecting the main battery (4) to the rectifier bridge (P);

a bypass circuit (60) connected in parallel to the terminals of the main circuit (59) and including the secondary voltage source (6) in series with the first switch (K1);

a reversible DC/DC converter (62) electrically connected between the main circuit (59) and the bypass circuit (60) between the positive pole of the main battery (4) and a middle point of the first switch (K1) and the secondary voltage source (6).

15. The control device (1) according to claim 14, characterized in that a supervising circuit (63) controls and powers the switching status of the switches (K1, K2), the charge status of the main battery (4) and of the secondary voltage source (6), the direction of conversion of the DC/DC converter (62), and the operating mode of the rectifier bridge (P) in alternator or motor mode.

16. The control device (1) according to claim 14, characterized in that the first switch (K1) is crossed by the maximum permanent current of the rotating electrical machine (2) in alternator mode, while the second switch (K2) is used for the transient phases when the output voltage of the rotating electrical machine (2) is greater than a pre-defined voltage threshold.

17. The control device (1) according to claim 15, characterized in that the supervising circuit (63) reverses the switching status of the switches (K1, K2) when the output voltage of the electrical machine is regulated above the voltage threshold, with the first switch (K1) open and the second switch (K2) closed, in order to supply current to the electric supply network (5) by the DC/DC converter (62).

18. The control device (1) according to claim 17, characterized in that the energy of the rotating electrical machine (2) operating in alternator mode permits, when the second switch (K2) is closed, to supply the DC/DC converter (62) and to charge the secondary voltage source (6) while storing energy.

19. The control device (1) according to claim 14, characterized in that high power receptors (64) are connected electrically in parallel with the bypass circuit (60) and the alternator-starter (2).

20. The control device (1) according to claim 1, characterized in that the rotating electrical machine is an alternator-starter for an automobile.

* * * * *